(12) United States Patent
Mace

(10) Patent No.: US 6,921,325 B1
(45) Date of Patent: Jul. 26, 2005

(54) ANIMAL DRAGGER AND METHOD FOR USING AND STORING THE SAME

(76) Inventor: Stephen A. Mace, 24 Buchanan Ave., Lavale, MD (US) 21502

( * ) Notice: Subject to any disclaimer, the term of this patent is extended or adjusted under 35 U.S.C. 154(b) by 60 days.

(21) Appl. No.: 10/897,950

(22) Filed: Jul. 23, 2004

(51) Int. Cl.$^7$ ............................................ A22C 29/02
(52) U.S. Cl. ...................................................... 452/6
(58) Field of Search ............ 452/2–11, 102–105; 182/ 133–136; 30/164.5, 167, 167.1, 168, 169, 30/171; 294/82.1, 86.4, 19.3, 17, 26, 167; 43/5; 81/489, 490, 48.8; 7/106, 123; 16/110.1, 16/111.1; D8/105–107, 300, 301

(56) References Cited

U.S. PATENT DOCUMENTS

| | | | |
|---|---|---|---|
| 187,272 A * | 2/1877 | Hauschildt .................... 294/26 |
| 950,687 A * | 3/1910 | Abernethy .................... 294/26 |
| 1,182,790 A * | 5/1916 | Piper ........................... 119/799 |
| 1,753,566 A * | 4/1930 | Gannon et al. ............... 294/26 |
| 2,372,743 A * | 4/1945 | Schofield ...................... 294/26 |
| 2,463,706 A * | 3/1949 | Martineau .................... 294/26 |
| 2,516,620 A * | 7/1950 | Darling ........................ 294/26 |
| 2,536,535 A * | 1/1951 | Cederblad .................... 294/26 |
| 2,590,595 A * | 3/1952 | Ziebell ......................... 294/26 |
| 2,725,253 A * | 11/1955 | Wallman ...................... 294/26 |
| 3,197,097 A * | 7/1965 | Casuer et al. ............... 223/113 |
| 3,310,331 A | 3/1967 | Michaud | |
| 3,449,007 A * | 6/1969 | White .......................... 294/26 |
| 4,023,844 A * | 5/1977 | Roberts ........................ 294/26 |
| D255,317 S | 6/1980 | Slinkard | |
| 4,351,126 A | 9/1982 | Simonson | |
| 4,660,875 A | 4/1987 | Ziegler | |
| 4,691,465 A | 9/1987 | Dooley | |
| 5,029,921 A | 7/1991 | Houghton et al. | |

* cited by examiner

*Primary Examiner*—Thomas Price
(74) *Attorney, Agent, or Firm*—Clark A. D. Wilson

(57) ABSTRACT

A device for dragging a killed animal when hunting. The device has a cylindrical handle and a metal hook. The hook is detachable from the handle. When in use, the hook is inserted through a hole drilled through the midpoint of the handle and then secured with a wingnut or similar device. When not in use, the hook is inserted into two other holes drilled in the handle. These holes secure the hook to the handle and protect the user from the sharp tip of the hook. The dimensions of the device allow the user to keep it in a pocket when it is not being used.

5 Claims, 3 Drawing Sheets

ANIMAL DRAGGER AND METHOD FOR USING AND STORING THE SAME

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

When hunting animals, such as deer, the problem is transporting the kill from the kill site to the hunter's car. Often, this distance may be quite far and the animal may be quite heavy. An easy solution to this problem is to drag the animal along the ground. The easiest way to drag a killed animal is through the nose.

The proper tool must be used in order to easily drag the animal. The tool must be sturdy and comfortable to its user. In addition, since the hunter must often carry many additional items when hunting, an element of portability would be favored.

This type of tool would need to maintain a sharp edge in order to stick an animal through its tough nose. While this tool is not in use, the sharp edge can be hazardous. Another desired element would be for the tool to store safely with the dangerous elements being neutralized.

The claimed invention allows a hunter to store the tool in a safe position when not in use. It is small enough to keep the tool in a jacket or pants pocket. When needed, the invention is easily transformed into a durable and sturdy tool for dragging an animal over large and often difficult distances.

A. Field of the Invention

This invention relates to the action of dragging a killed animal for a desired distance.

B. Prior Art

There are devices in the prior art which perform the function of dragging a killed animal. There are different structures used to achieve this goal.

Roberts (U.S. Pat. No. 4,023,844), Simonson (U.S. Pat. No. 4,351,126), and Houghton (U.S. Pat. No. 5,029,921) describe devices for hauling and dragging animals. Roberts is a structure that has handles which fold down to rest parallel with the hook. Simonson is a gaff type structure with a long shaft and grip, which has a hook that folds down to a safety rest position. Houghton is a structure, which is a solid metal piece of a handle and hook, which is not storable in a safe manner.

The present invention improves on the prior art by offering a device that can be stored safely and conveniently in a pocket with a comfortable handle and additional safety features built in.

BRIEF SUMMARY OF THE INVENTION

This device allows its user to drag a killed animal. This device has two solid states and can be easily changed between the two. The first state is the state of use. The metal hook is used to pierce the animal's body; typically through the nose. It has a screw thread on the opposite end of the hook. The screw is inserted into a cylindrical handle so that the screw end will be partially inside the handle and partially sticking out. A stabilizing nut can then be screwed onto the part sticking out. The user can then stick the hook into an animal and grip the tool comfortably on the handle.

The second state is a state of storage. The handle is equipped with additional drilled holes for this purpose. These holes are drilled at slanted angles and are parallel to each other. The hook is inserted into both of these holes, so that the sharp end is safely recessed in a short hole on the flat end of the handle. The other end of the hook is inserted into the other hole, which is drilled into the side of the handle. The hole allows the screw end to exit out of the flat end opposite the storage place for the sharp end. At the screw end, a nut is attached to secure the metal hook into place. The use of the nut will prevent the hook from becoming accidentally exposed, thus becoming a danger. The user can then store the device in a pocket while not in use.

DETAILED DESCRIPTION OF THE EMBODIMENTS

Figure 1:
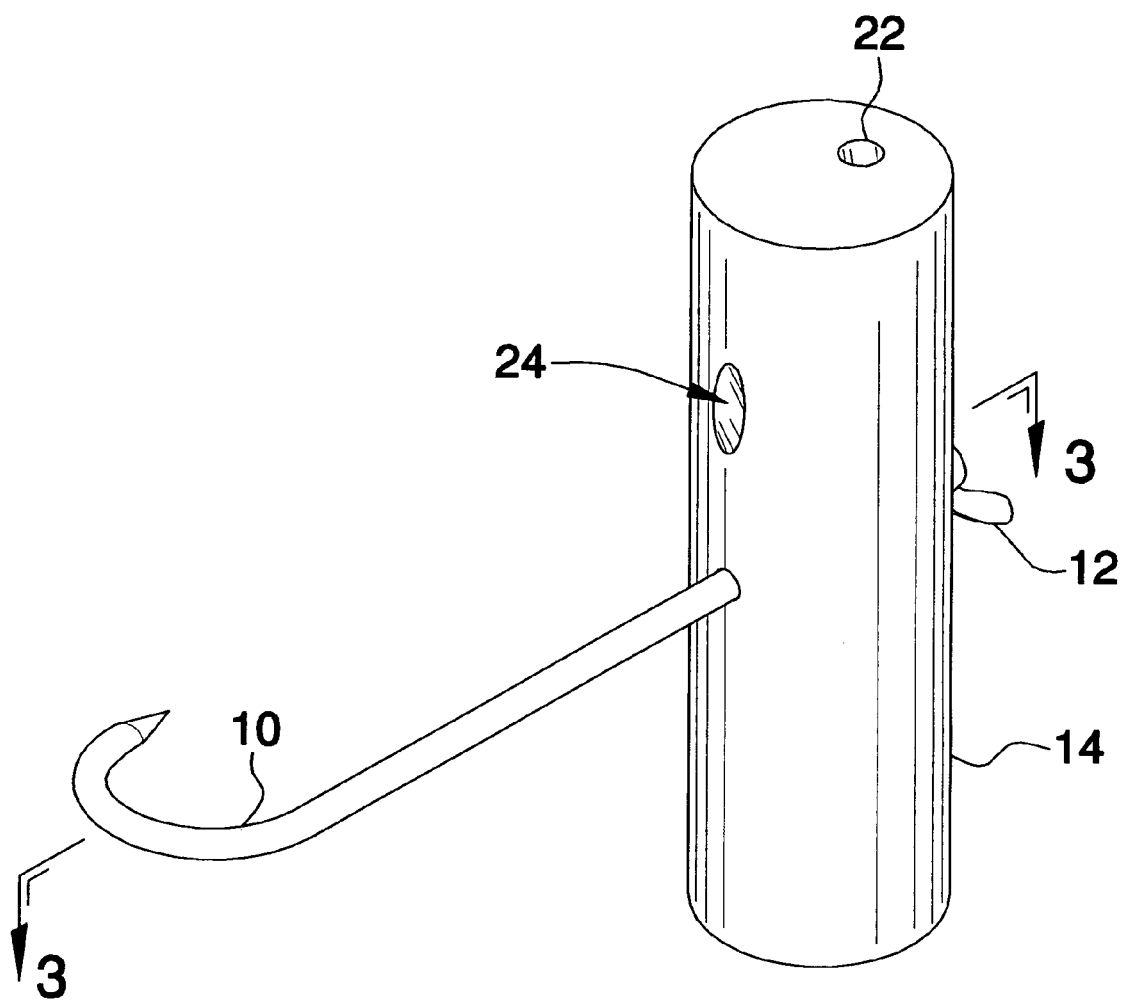
FIG. 1 is a perspective view of the device when connected for dragging an animal.
Figure 2:
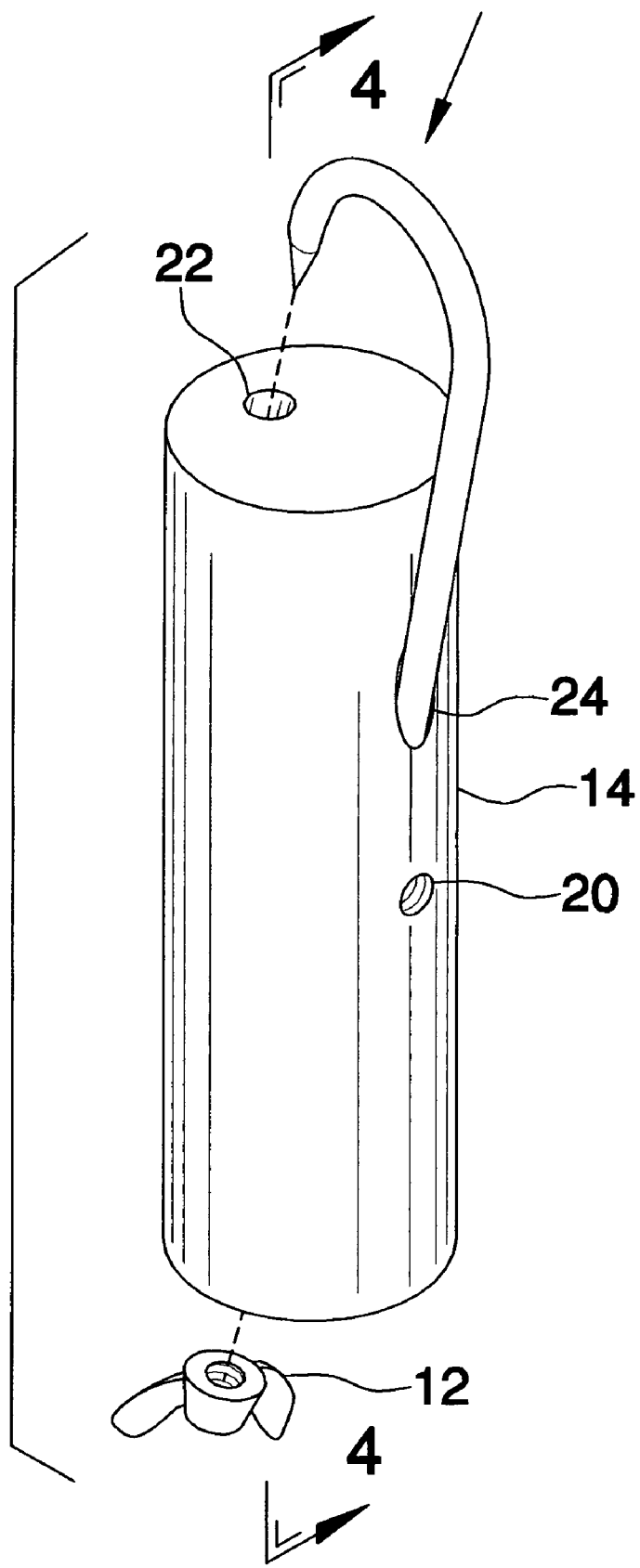
FIG. 2 is a perspective view of the device showing how the hook is safely stored when not being used.

The device is composed generally of separate parts. The handle 14 is of a cylindrical shape. The length of the handle is approximately 6 inches, so that it can be both comfortably gripped and stored. The diameter of the cylinder will be approximately 2 inches for comfort and storage purposes. FIG. 1. The material used to make the handle 14 must be sturdy and weather resistant. Plastic, metal or wood will all be appropriate choice for the handle.

Figure 4:
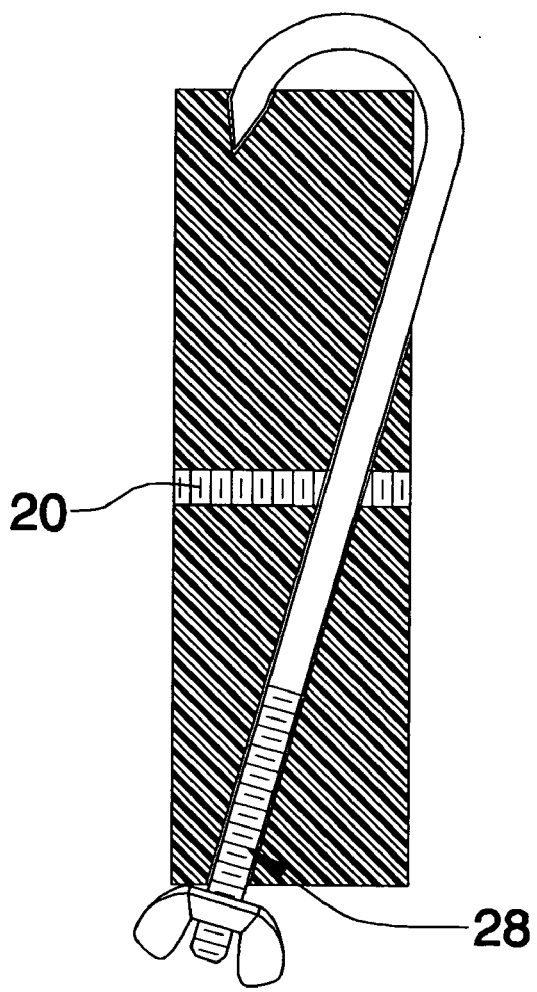
FIG. 4 is a cross section view of the device along line 4 in FIG. 2.

Three holes are drilled into the handle 14. A threaded hole 20 is drilled through the midpoint of the handle. FIG. 1. It will be drilled in a parallel direction to the flat ends on either side of the handle. This hole will be threaded. The other two holes will be drilled parallel to each other. The point hole 22 is drilled on one of the flat ends of the handle. The point hole 22 is recessed but not deep and ends within the handle structure. The long hole 24 is drilled from the opposite flat end of the handle to the long curved edge of the handle. FIGS. 1, 4 The long hole 24 is drilled at a slant and is not threaded. The long hole 24 and point hole 22 are spaced apart according to the dimensions of the drag hook 10.

Figure 3:
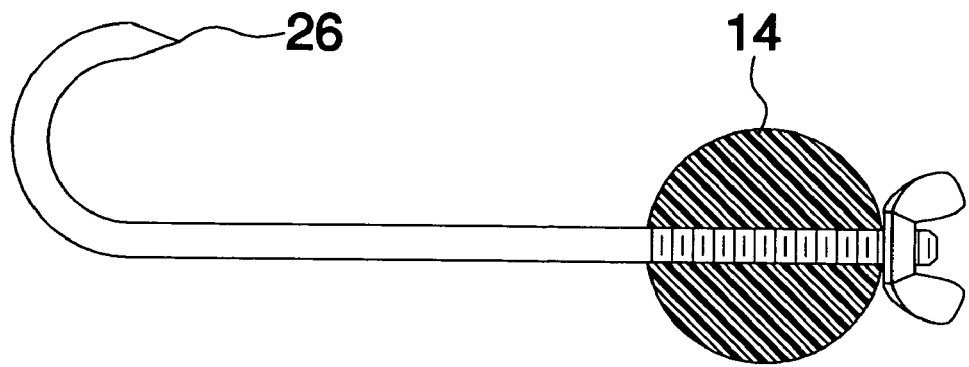
FIG. 3 is a cross section view of the device along line 3 in FIG. 1.

The drag hook 10 has a long straight portion with a threaded end 28. FIGS. 3, 4 The other end is curved. At the end of the curved portion is the sharp point end 26. The hook will most likely be made of sturdy metal and its dimensions will be such to allow the user to drag and store.

The nut 12 is most likely a wing nut or a similar object. It will be of the size appropriate to screw onto the threaded end 28 of the hook 10. FIG. 3. The material used for the nut and hook is most likely metal.

When the device is being used to drag an animal it is in the drag position as depicted in FIG. 1. The threaded end 28 of the hook 10 is screwed into the threaded hole 20 of the handle 14. The threaded end 28 will be screwed through the threaded hole 20 so that a portion will stick out of the handle. The nut 12 is screwed onto the portion of the threaded end 28 sticking out of the handle. The device is secured in place and the hunter can drag an animal.

When the device is not being used it is in the stored position as depicted in FIG. 4. The threaded end 28 of the hook 10 is inserted into the long hole 24 and pushed through so that a portion sticks out of the handle 10. The sharp point end 26 is inserted into the point hole 22. The nut 12 is screwed onto the threaded end 28 of the hook 10, which is sticking out of the handle. The nut is screwed on sufficiently to secure the hook in place. The user may then safely store the device in a pocket or bag without worrying about getting injured.

What is claimed is:

1. A device for dragging killed animals comprising:
   a. handle;
      wherein said handle is a cylinder with a first and second flat ends and a curved diameter;
      wherein said handle is composed of a solid material;
      wherein said handle is of predetermined dimensions;
      wherein said handle has a first hole drilled through the midpoint of the curved diameter and parallel to the flat ends;
      wherein said handle has a second hole of shallow depth and definite bottom in the first flat end;
      wherein said handle has a third hole drilled from a predetermined location on the curved diameter through to the second flat end;
   b. a hook;
      wherein said hook has a threaded end, a long straight portion, a curved portion, and a sharp end;
      wherein said hook is composed of a solid material;
      wherein said hook slides removably into the drilled holes in the handle;
   c. a threaded securing mechanism;
      wherein said mechanism screws tightly onto the threaded end of said hook; and
      wherein said mechanism is composed of a solid material;
   d. said third hole is adapted to store said long straight portion of said hook when said second hole receives said sharp end of said hook.

2. The device described in claim 1 wherein the first hole drilled through the midpoint is threaded.

3. A method for using the device described in claim 1 comprising:
   a. sliding the threaded end of the hook through the first hole drilled through the midpoint of the handle;
   b. screwing the threaded securing mechanism onto the end of the threaded end of the hook a desired amount;
   c. gripping the handle in a comfortable fashion;
   d. piercing a sturdy part of the animal with the sharp end of the hook; and
   e. pulling the animal with the device.

4. A method for using the device described in claim 2 comprising:
   a. screwing the threaded end of the hook through the threaded first hole drilled in the midpoint of the handle;
   b. screwing the threaded securing mechanism onto the end of the threaded end of the hook a desired amount;
   c. gripping the handle in a comfortable fashion;
   d. piercing a sturdy part of the animal with the sharp end of the hook; and
   e. pulling the animal with the device.

5. A method for storing the device described in either claim 1 or 2 when the device is not in use comprising:
   a. inserting the threaded end of the hook a sufficient distance into the third drilled hole in the handle;
   b. inserting the sharp end of the hook into the second drilled hole in the handle until it rests at the bottom of the hole;
   c. screwing the securing means onto the end of the threaded end of the hook until the hook is secure in place.

* * * * *